United States Patent [19]

Bradley, Jr. et al.

[11] Patent Number: 4,568,112
[45] Date of Patent: Feb. 4, 1986

[54] PIPE JOINT RESTRAINER GLANDS

[75] Inventors: Earl C. Bradley, Jr.; Jack Burkholder; Earl F. Bullock, all of Eastland, Tex.

[73] Assignee: Ebba Iron Inc., Eastland, Tex.

[21] Appl. No.: 614,796

[22] Filed: May 29, 1984

Related U.S. Application Data

[63] Continuation-in-part of Ser. No. 446,020, Dec. 1, 1982, abandoned.

[51] Int. Cl.$^4$ ............................................. F16L 33/00
[52] U.S. Cl. .................................... 285/238; 285/349; 285/368; 285/415
[58] Field of Search ............... 285/363, 368, 414, 238, 285/349, 415

[56] References Cited

U.S. PATENT DOCUMENTS 2,738,993 3/1956 Wilson ........................... 285/414 X
4,092,036 5/1978 Sato et al. ........................... 285/337
4,183,560 1/1980 Wyss ................................. 285/368 X
4,295,668 10/1981 Louthon ........................ 285/368 X
4,372,587 2/1983 Roche ............................ 285/368 X

FOREIGN PATENT DOCUMENTS 1420486 11/1965 France ............................... 285/368

Primary Examiner—Dave W. Arola
Attorney, Agent, or Firm—H. Mathews Garland

[57] ABSTRACT

A restraining ring and gland for a mechanical joint with a plain plastic pipe end including two semi-circular members securable together by lateral end flanges and having a cylindrical tapered bore having a roughened surface and provided with longitudinally spaced internal annular blunt edged ribs for gripping the plastic pipe without cutting the pipe surface. When the PVC pipe is coupled to iron pipe, one gland is used. When the PVC pipe is connected to a PVC bell or fitting, two glands are used secured together by longitudinal bolts.

10 Claims, 11 Drawing Figures

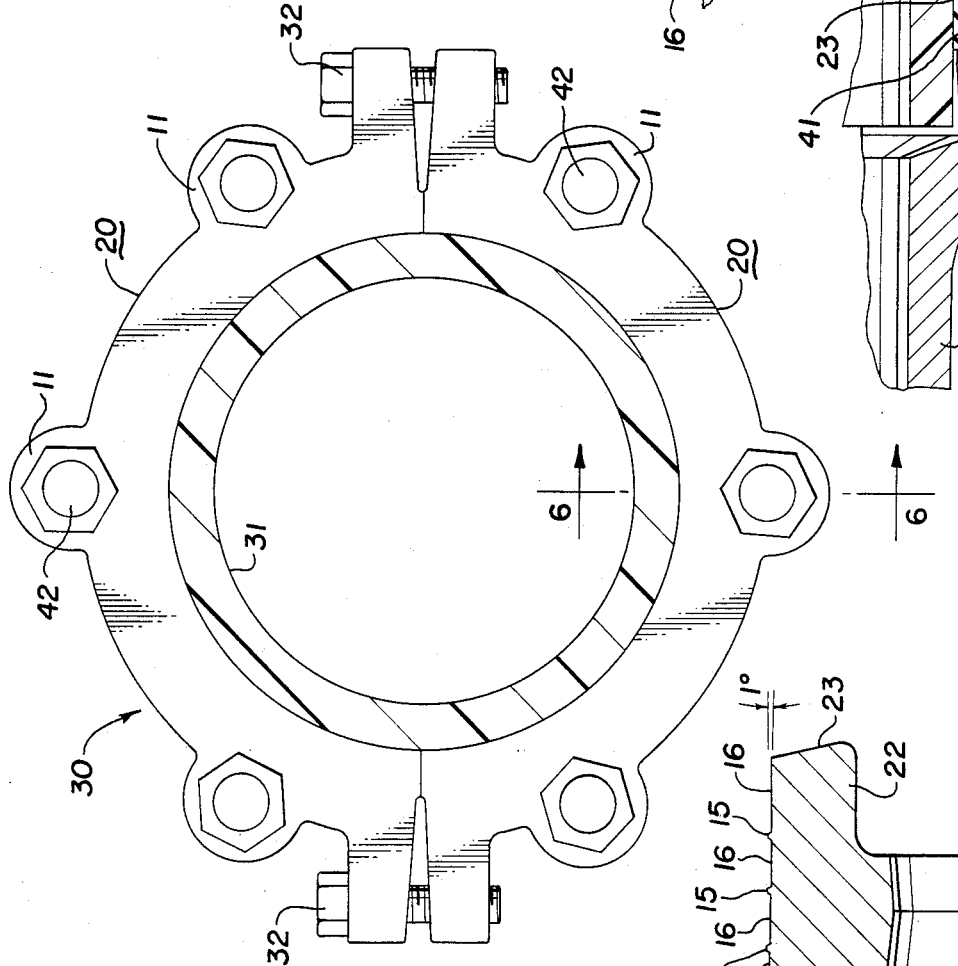

PIPE JOINT RESTRAINER GLANDS

This is a continuation-in-part of application Ser. No. 446,020 filed Dec. 1, 1982 and now abandoned.

This invention relates to pipe joints and more particularly relates to pipe joint restrainer glands for use with plastic pipe.

In recent years it has become common to use plastic pipe such as pipe made of polyvinyl chloride, usually referred to as PVC pipe, in piping systems particularly for water. It has also been common in such systems to use fittings and valves which are primarily made for use with cast and ductile iron pipe. The principal problem presented by such joints is gripping or grasping the PVC pipe. One method of securing the PVC pipe has been the use of conventional concrete thrust blocks used to keep joints together. Other proposals for securing PVC pipe in a joint are shown in U.S. Pat. Nos. 4,336,959; 4,295,668; and 4,372,587. The devices shown in U.S. Pat. Nos. 4,336,959 and 4,372,587 include split flanges having sharp internal teeth for piercing the surface of the plastic pipe. The use of such teeth or serrations causes pipe surface damage which may result in premature pipe failure at high pressures causing a pipe to separate and blow off.

It is a principal object of the invention to provide a new and improved mechanical joint type gland useable with PVC pipe.

It is another object of the invention to provide a PVC pipe joint restraining device which does not require the use of restraints such as concrete thrust blocks or clamps and tie rods.

It is another object of the invention to provide a PVC pipe restraining device which grips the pipe and additionally serves the function of a conventional gland in a mechanical joint.

It is a still further object of the invention to provide a new and improved split type restraining ring which is not manufactured by casting two separate halves but rather uses a single integral casting.

It is another object of the invention to provide a PVC pipe joint restraining device which does not cut and thus damage the PVC pipe.

In accordance with the invention there is provided a mechanical joint gland and pipe restraining ring for use in making up a mechanical joint with PVC pipe comprising a split restraining ring adapted to bolt around a plain end on a PVC pipe including internal circumferential ribs having blunt edges spaced longitudinally along a tapered bore through the ring and rough bore surfaces between the ribs for gripping the PVC pipe.

The foregoing objects and advantages together with the specific details of the invention will be better understood from the following description thereof taken in conjunction with the accompanying drawings wherein:

FIG. 3 is a side view in elevation of the casting of FIG. 1;

FIG. 4 is an enlarged fragmentary view in section taken along the line 4—4 of FIG. 1;

FIG. 5 is a view in section and elevation of a mechanical joint restraining ring and gland formed from the casting of FIG. 1 clamped around a section of PVC pipe in a mechanical joint formed with the plain end on such pipe;

FIG. 6 is an enlarged fragmentary view in section and elevation along the line 6—6 of FIG. 5 showing the restraining ring and gland of the invention installed in a mechanical joint between a plain PVC pipe end and a cast or ductile iron bell on a fitting or pipe;

FIG. 7 is a substantially enlarged fragmentary view in section along the inner face of the restraining ring and gland of the invention showing one of the serrations or ribs with the adjacent rough bore surface between the serrations;

Figure 1:
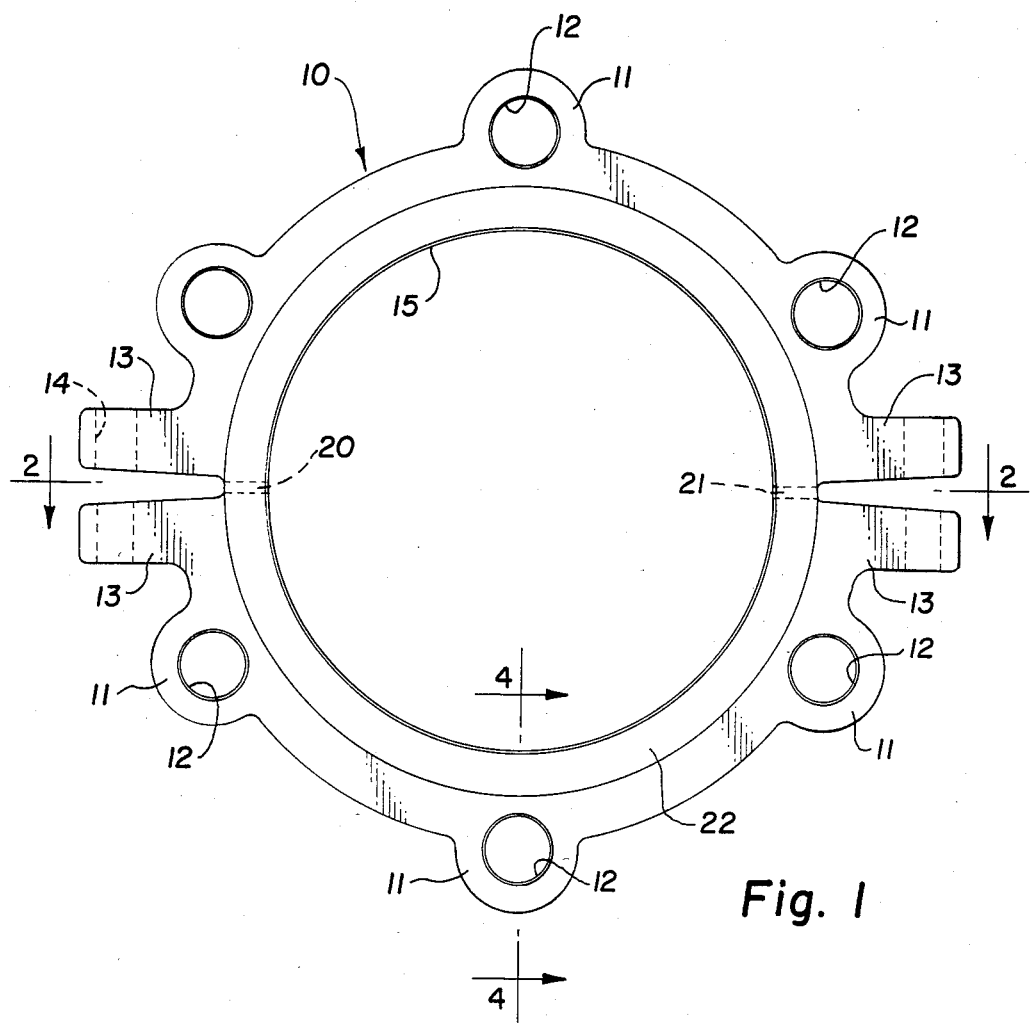
FIG. 1 is a view in elevation of a casting from which the two half circular members forming the restraining ring gland of the invention are formed.

Referring to FIG. 1, the first step in the manufacture of the restraining ring and gland of the invention is the casting of the ring-shaped member 10. The case member 10 has circumferentially spaced ears 11 each of which is provided with an axial bolt hole 12. At opposite sides of the member 10 integral pairs of flanges 13 are formed each with a bolt hole 14 extending generally perpendicular to the flange. The casting is machined in one piece and then cut into two equal halves by making diametrically opposed saw cuts so that the two halves do not make a full 360 degree circle. As illustrated in FIGS. 4 and 7, the bore of the casting is machined providing spaced internal circumferential serrations 15 and a rough cylindrical bore surface 16 with a taper of about 1 degree toward the load end as shown in FIG. 4. The rough bore surface 16 is a "phonograph surface" formed by adjacent grooves. As seen in FIG. 7, each serration 15 is in cross section a quadrilateral having sloping opposite sides from a base to a narrower flat top. A typical serration has approximate dimensions of a 0.050" base, a height of 0.035", and sides sloping together to a 0.015" top. The serrations are shaped to indent but not pierce or break the surface or skin of PVC pipe. After the member 10 is machined it is then cut into two identical half circular members 20 by removing from opposite sides of the casting a portion of the material 21 between the side flanges 13. The thickness of the material 21 removed from the casting is typically about 0.187" so that when the halves are clamped together around a PVC pipe the end flanges will not meet allowing the halves to be pulled tightly into engagement with the pipe.

An axial flange 22 is cast integral with the member 10 provided with an inwardly sloping face or edge 23 which performs a gasket holding function in the final joint installation using the restraining ring and gland.

Figure 2:
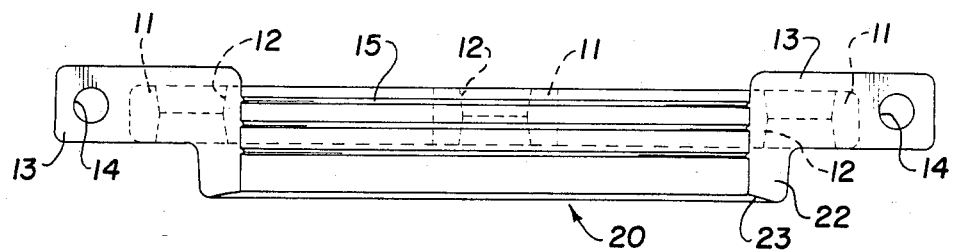
FIG. 2 is an inside edge view in elevation of one of the restraining ring and gland halves formed from the casting of FIG. 1 as seen generally along the line 2—2 of FIG. 1.

Referring to FIGS. 5 and 6, a split mechanical joint gland and restraining ring device 30 is secured around the plain end of a PVC pipe 31. The device 30 comprises the two identical half rings 20 secured together around the PVC pipe by bolts 32 which connect between adjacent flanges 13 on the members 20 at the opposite sides of the restraining ring. When the two ring halves 20 are bolted together around the PVC pipe the flanges 13 do not come together or become "iron bound" so that the bore surfaces including the serrations 15 and rough surface portions 16 fit snugly against the outer surface of the PVC pipe. The ribs 15 and the surface portions 16 along the bore grip the pipe surface while not cutting into the material of the pipe wall. The major holding is effected by the rough bore surface 16. The serrations 15 indent but do not cut into the pipe surface skin. The PVC pipe is held against longitudinal movement relative to the restraining ring. As seen in FIG. 6 the plain end of the PVC pipe is telescoped into a bell 40 formed on a cast iron or ductile fitting or valve 41. The end edge 23 on the axial flange 22 of the restraining ring engages the ring seal 41 urging the ring seal toward the bell squeezing the seal inwardly around the PVC pipe to effectively shut off any flow between the seal and the PVC pipe and bell. As in a typical mechanical joint the restraining ring formed by the half ring members 21 is held to the bell by longitudinal T-bolts 42 which extend between the restraining ring ears 11 and the flange 43 on the bell. The 1 degree taper of the bore of the restraining ring and gland toward the pressure end of the gland, that is the end toward which force is applied to the gland when it is drawn tight by the bolts 42 and away from which pressure within the pipe tends to try to move the gland actually tightens the grip of the gland on the PVC pipe. Internal hydrostatic pressure within the joint held together by the gland and the flange 43 tries to move the PVC pipe 31 away from the fitting or valve 41 causing the gland half sections to try to roll further inwardly against the pipe surface improving the gripping effect of the serrations 15 and the rough bore surfaces 16. The holding power of the gland with the PVC pipe is thus increased as pressure increases within the pipe. The taper within the gland half sections as well as the fact that the end flanges on the gland half sections are not drawn together into contact permits the sufficient slight roll movement of the half sections caused by the taper so that the tightening effect in response to the increased pressure is effected. Other joint assemblies including joint restrainers embodying the features of the invention are illustrated in FIGS. 8, 9, 10 and 11 which show examples of various types of restraint of PVC pipe into various types of common water works applications. Each of these joint restrainers uses one or two glands embodying the features of the invention. Each of the glands is made in half circular sections including the tapered bore having the roughened surface and the spaced serrations having the dulled or blunted edges as illustrated in FIG. 7 which merely indent rather than pierce or bite into the PVC pipe surface. Each of the gland half sections also is provided with the end flanges 13 as shown in FIGS. 1 and 2.

Figure 8:
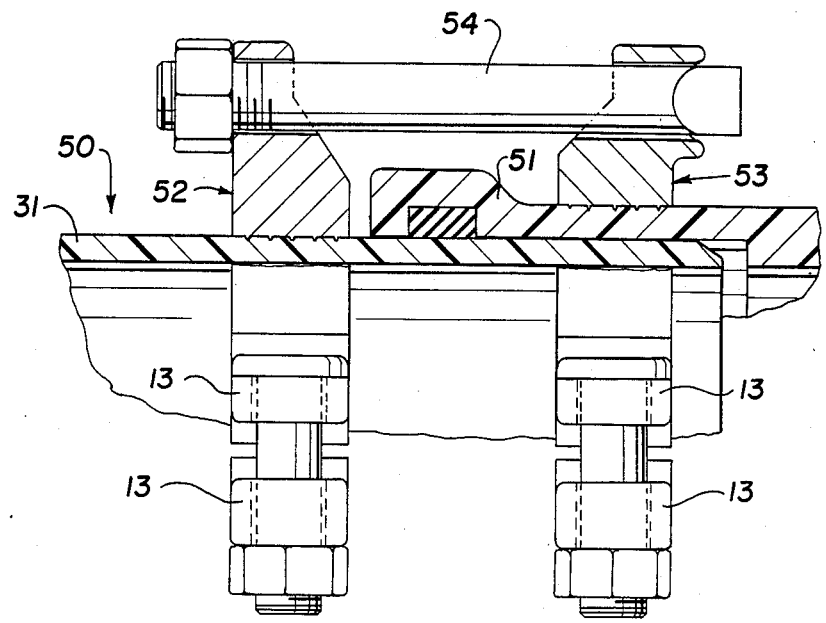
FIG. 8 is a fragmentary view in section and elevation of a coupling between a PVC pipe and a PVC bell employing the features of the invention.

FIG. 8 shows a joint assembly 50 for holding the PVC pipe 31 in a bell-shaped PVC fitting 51. A split ring 52 fits on the pipe 31 and a split ring 53 fits on and grips the PVC fitting 51. Each of the rings 51 and 53 include the pipe gripping features of the invention. The rings 52 and 53 are held together by longitudinal bolts 54 which prevent the rings from pulling apart while the rings grip the PVC pipe and fitting.

Figure 9:
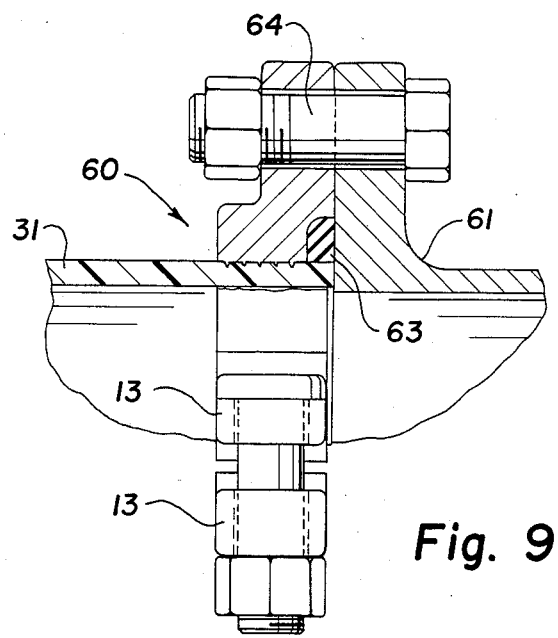
FIG. 9 is a fragmentary view in section and elevation of a coupling between a PVC pipe and a flange on another pipe employing the features of the invention.

FIG. 9 illustrates a joint assembly 60 for holding the PVC pipe 31 with a flanged pipe end 61. The split ring 60 includes the tapered bore provided with the roughened surface and the spaced serrations as well as an internal annular gasket recess 63. The split ring 60 is secured by bolts 64 to the flanged pipe end.

Figure 10:
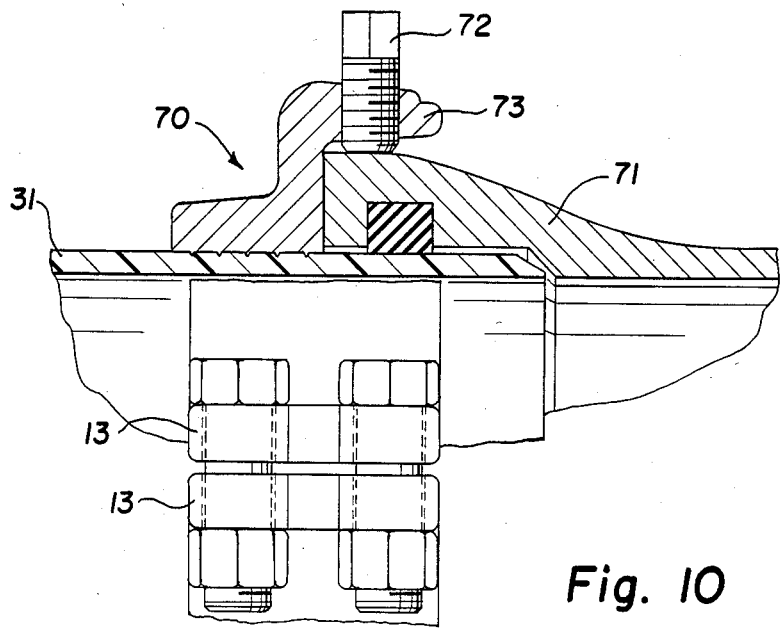
FIG. 10 is a fragmentary view in section and elevation of a coupling between a PVC pipe and an iron bell embodying the features of the invention.

FIG. 10 illustrates a joint assembly 70 between the PVC pipe 31 and a cast iron bell end 71 on a pipe. The split ring 70 includes the roughened tapered bore having the spaced internal serrations for gripping the surface of the pipe 31. The split ring 70 is secured to the pipe bell 71 by circumferentially spaced radial set screws 72 threaded through a longitudinal flange 73 on the split ring against the outer surface of the bell holding the split ring with the bell.

Figure 11:
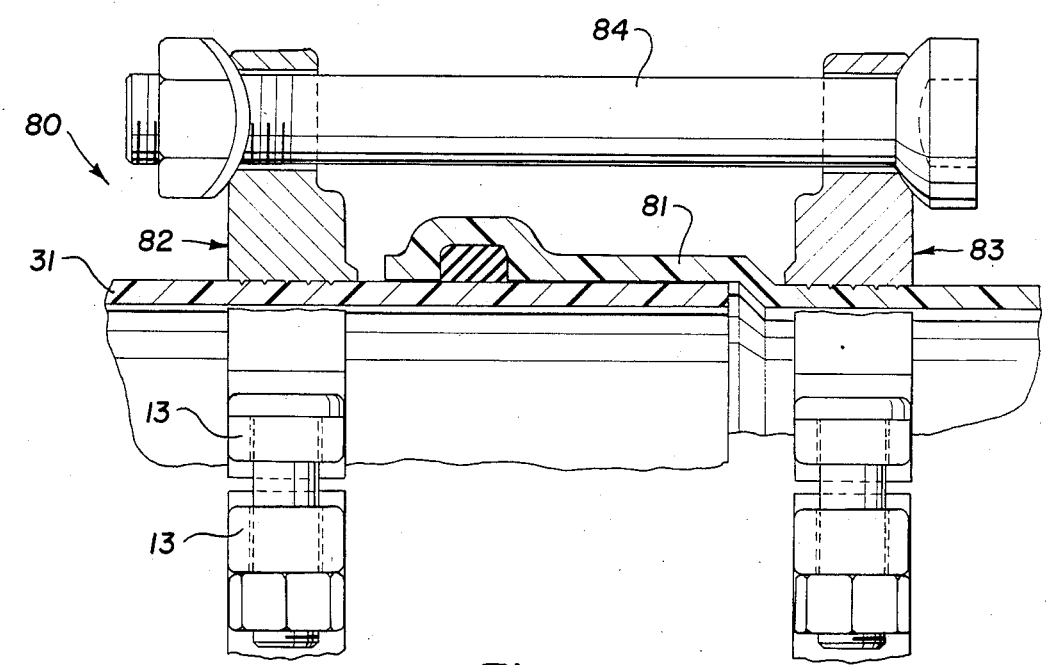
FIG. 11 is a fragmentary view in section and elevation of a coupling between a PVC pipe and a PVC bell embodying the features of the invention.

A joint assembly 80 as shown in FIG. 11 holds the PVC pipe 31 in a PVC bell 81 and includes two split rings 82 and 83 each of which is provided with a roughened tapered bore and spaced internal serrations for gripping the pipe 31 and the bell 81 respectively. Longitudinal bolts 84 hold the split rings 82 and 83 together. Each of the rings 82 and 83 grip the PVC pipe and bell with the roughened bore surface and the serrations with the holding effect on both the pipe and bell increasing with higher pressures within the pipe bell.

It will now be seen that a new and improved pipe joint restrainer gland and pipe joint assemblies employing such gland have been described and illustrated. The gland is a split ring having a tapered roughened bore provided with internal spaced blunt edged serrations with the split joint sections having end flanges and encompassing less than 360 degrees of a PVC pipe so that when the split rings are secured together and tightened on a PVC pipe the end flanges do not meet. The serrations indent rather than cutting into a PVC pipe surface. The split ring tightens as pressure increases within the PVC pipe due to a roll effect caused by the tapered bore.

What is claimed is:

1. A restraining ring and gland for a mechanical pipe joint for couplng with a plain plastic pipe end, said restraining ring and gland comprising: semi-circular ring members each having opposite end flanges adapted to be fastened together for securing said ring members together around said plastic pipe; said members having cylindrical tapered bore portions having roughened surfaces sized to engage the outer surface of said plastic pipe, said bore portions being tapered toward the pressure end of said ring member; said bore portions having annular longitudinally spaced serrations having blunt inside edges arranged circumferentially around said bore for gripping the outer surface of said plastic pipe, said roughened surfaces and said spaced serrations in combination holding said pipe against longitudinal movement; said members emcompassing less than 360 degrees around said plastic pipe whereby said opposite end flanges are spaced apart on opposite sides of said gland when connected on said plastic pipe; and said members have means for connecting said gland with an adjacent pipe fitting on the pipe to which said gland is coupled by said joint.

2. A restraining ring and gland in accordance with claim 1 wherein said blunt serrations have flat inside edges and sloping sides.

3. A restraining ring and gland in accordance with claim 2 wherein said roughened surfaces of said tapered bore portions have a phonograph finish comprising annular spaced ridges.

4. A restraining ring and gland in accordance with claim 2 wherein said serrations are substantially quadrilateral in cross section having sloping side walls and said blunt inside edge is a flat surface substantially narrower than the base.

5. A restraining ring and gland in accordance with claim 4 wherein the height of said serrations is approximately 0.035 inches, the base is approximately 0.050 inches, and the edge is approximately 0.015 inches wide.

6. A restraining ring and gland in accordance with claim 4 wherein said roughened surfaces of said tapered bore has a phonograph finish comprising spaced annular ridges.

7. A restraining ring and gland in accordance with claim 5 wherein said roughened surfaces of said tapered bore has a phonograph finish comprising spaced internal annular ridges.

8. A restraining ring and gland in accordance with claim 1 in combination in a pipe joint with a metal pipe having a bell end into which said plastic pipe is telescoped, said bell end including circumferentially spaced connecting ears and said gland means for connecting comprising has circumferentially spaced corresponding connecting ears and including longitudinal bolts secured between said ears on said gland and said ears on said bell flange, and an annular gasket within said bell end engaged with an adjacent end edge of said gland.

9. A restraining ring and gland in accordance with claim 1 in a pipe joint between said plastic pipe and a plastic pipe fitting having an enlarged bell end into which said plain plastic pipe end telescopes including a second restraining ring and gland on said bell end, said gland on said pipe end and said gland on said bell end having corresponding circumferentially spaced connecting ears comprising said means for connecting and longitudinal bolts between said ears on said glands holding said glands together longitudinally, and an internal annular gasket within said bell end around said plain pipe end.

10. A restraining ring and gland in accordance with claim 1 in a pipe joint including a metal flanged pipe end having an external annular flange and wherein said plain plastic pipe end has an end edge engaging said metal pipe flange and said gland and said pipe flange have corresponding circumferentially spaced connecting ears comprising said means for connecting longitudinal bolts connecting said ears of said flange and said gland together for holding said gland and said plastic pipe with said metal pipe flange, and said gland having an internal annular gasket recess in said end of said gland adjacent said flange, and an annular gasket within said recess held against said flange by said gland.

* * * * *